(12) United States Patent
Folgoas et al.

(10) Patent No.: US 12,429,961 B2
(45) Date of Patent: Sep. 30, 2025

(54) WRITING INSTRUMENT

(71) Applicants: SOCIÉTÉ BIC, Clichy (FR); BIC Violex Single Member S.A., Anoixi (GR)

(72) Inventors: Loic Folgoas, Clichy (FR); Georgios Georgakis, Anoixi (GR)

(73) Assignees: SOCIÉTÉ BIC, Clichy (FR); BIC Violex Single Member S.A., Anoixi (GR)

( * ) Notice: Subject to any disclaimer, the term of this patent is extended or adjusted under 35 U.S.C. 154(b) by 0 days.

(21) Appl. No.: 18/004,524

(22) PCT Filed: Jul. 1, 2021

(86) PCT No.: PCT/EP2021/068189
§ 371 (c)(1),
(2) Date: Jan. 6, 2023

(87) PCT Pub. No.: WO2022/008342
PCT Pub. Date: Jan. 13, 2022

(65) Prior Publication Data
US 2023/0215199 A1    Jul. 6, 2023

(30) Foreign Application Priority Data

Jul. 7, 2020 (EP) ..................................... 20305772

(51) Int. Cl.
*G06F 3/0354* (2013.01)
*G06F 3/01* (2006.01)
(Continued)

(52) U.S. Cl.
CPC .......... *G06F 3/03545* (2013.01); *G06F 3/011* (2013.01); *G06T 7/73* (2017.01);
(Continued)

(58) Field of Classification Search
CPC ........ G06F 3/03545; G06F 3/011; G06T 7/73; G06T 2207/30204; G06V 20/20;
(Continued)

(56) References Cited

U.S. PATENT DOCUMENTS

| 7,156,570 B2 * | 1/2007 | Cetera .................. B43K 29/007 401/6 |
| 7,489,308 B2 * | 2/2009 | Blake ...................... G06F 3/043 345/173 |

(Continued)

FOREIGN PATENT DOCUMENTS

| CN | 1774690 A | 5/2006 |
| CN | 101856933 A | 10/2010 |

(Continued)

OTHER PUBLICATIONS

Extended European Search Report issued in European Application No. EP 20305772.4 on Feb. 4, 2021 (4 pages).
(Continued)

*Primary Examiner* — Michael J Jansen, II
(74) *Attorney, Agent, or Firm* — Bookoff McAndrews, PLLC

(57) ABSTRACT

A writing instrument comprising a body having an axis, a writing tip, a reservoir and at least one visual mark being a specific mark for augmented reality applications, the at least one visual mark being configured to be hidden/visible when the writing tip is distant from a writing surface and to be respectively visible/hidden when the writing tip is in contact with a writing surface, at least a portion of the body being configured to allow the at least one visual mark to adopt two states, visible and hidden configuration.

20 Claims, 2 Drawing Sheets

(51) Int. Cl.
*G06T 7/73* (2017.01)
*G06V 20/20* (2022.01)
*G06V 30/142* (2022.01)
*B43K 8/00* (2006.01)

(52) U.S. Cl.
CPC .......... *G06V 20/20* (2022.01); *G06V 30/1426* (2022.01); *B43K 8/003* (2013.01); *G06T 2207/30204* (2013.01)

(58) Field of Classification Search
CPC ...... G06V 30/1426; B43K 8/003; B43K 7/02; B43K 29/08
See application file for complete search history.

(56) References Cited

U.S. PATENT DOCUMENTS

| | | | |
|---|---|---|---|
| 7,941,338 B2 | 5/2011 | Silverbrook et al. | |
| 9,594,441 B2* | 3/2017 | Liu | G06F 3/03545 |
| 9,684,415 B2* | 6/2017 | Lin | G06F 3/0421 |
| 10,101,824 B2* | 10/2018 | Pathak | G06F 3/03545 |
| 10,254,856 B2 | 4/2019 | Osterhout | |
| 10,685,596 B2* | 6/2020 | Yen | G09G 3/22 |
| 10,719,143 B2* | 7/2020 | Connellan | G06F 3/011 |
| 10,719,953 B1* | 7/2020 | Ye | G06T 7/246 |
| 10,942,585 B2* | 3/2021 | Yamada | G06F 3/04883 |
| 11,209,916 B1* | 12/2021 | Zimmermann | G06F 3/0325 |
| 11,221,686 B2* | 1/2022 | Nakayama | B43K 27/08 |
| 11,327,571 B2* | 5/2022 | Nguyen | G06F 3/0304 |
| 11,460,956 B2* | 10/2022 | Short | H04N 5/33 |
| 2004/0046736 A1 | 3/2004 | Pryor et al. | |
| 2004/0160429 A1* | 8/2004 | Blake | G06F 3/03545 |
| | | | 345/179 |
| 2006/0147245 A1* | 7/2006 | Cetera | B43K 29/007 |
| | | | 401/6 |
| 2015/0138086 A1* | 5/2015 | Underkoffler | G06F 3/03545 |
| | | | 345/158 |
| 2015/0317000 A1* | 11/2015 | Liu | G06F 3/03545 |
| | | | 345/179 |
| 2016/0018947 A1* | 1/2016 | Lin | G06F 3/03545 |
| | | | 345/175 |
| 2017/0220202 A1* | 8/2017 | Short | G06F 3/0425 |
| 2018/0032159 A1* | 2/2018 | Pathak | G06V 30/164 |
| 2019/0057640 A1* | 2/2019 | Yen | H04N 7/0806 |
| 2020/0042111 A1* | 2/2020 | Connellan | G06F 3/04883 |
| 2020/0363881 A1* | 11/2020 | Nakayama | B43K 25/028 |
| 2021/0026464 A1* | 1/2021 | Yamada | G06F 3/0346 |
| 2022/0083143 A1* | 3/2022 | Nguyen | G06F 3/017 |
| 2023/0215199 A1* | 7/2023 | Folgoas | G06V 20/20 |
| | | | 345/156 |

FOREIGN PATENT DOCUMENTS

| | | |
|---|---|---|
| CN | 108140360 A | 6/2018 |
| CN | 110114780 A | 8/2019 |
| CN | 111344654 A | 6/2020 |
| FR | 2776959 A1 | 10/1999 |
| WO | 0162520 A1 | 8/2001 |

OTHER PUBLICATIONS

First Search issued in corresponding application CN202180043635.8, issued Aug. 29, 2024.

* cited by examiner

WRITING INSTRUMENT

CROSS REFERENCE TO RELATED APPLICATIONS

This application is a National Stage application of International Application No. PCT/EP2021/068189, filed on Jul. 1, 2021, now published as WO2022008342, which claims priority to European patent application EP20305772.4, filed on Jul. 7, 2020, now published as EP3936345, its content being incorporated herein by reference.

TECHNICAL FIELD

The present disclosure relates to a writing instrument, for example a writing instrument configured to be tracked when contacting a writing surface, for example in the frame of applications for tracking and positioning a writing instrument in a 2D or 3D space, for example in the frame of augmented reality applications and/or writing digitalizations.

BACKGROUND

Traditional writing instruments for augmented reality applications and/or writing digitalizations are usually complex and expensive, such as, for example, active pens. Therefore, a need exists to provide a simpler and/or cost effective writing instrument adapted for augmented reality applications and/or writing digitalization.

SUMMARY

In embodiments a writing instrument comprises a body having an axis, a writing tip, a reservoir and at least one visual mark being a specific mark for augmented reality applications, the at least one visual mark being configured to be hidden/visible when the writing tip is distant from a writing surface (i.e. not contacting any writing surface) and to be respectively visible/hidden when the writing tip is in contact with a writing surface, at least a portion of the body being configured to allow the at least one visual mark to adopt two states, visible and hidden configurations.

An axial direction corresponds to the axis of the body. The writing tip may be a felt tip, a ballpoint tip, a mechanical pencil, a graphite pencil lead, chalk, a stylus tip, or any other means making it possible to write on a substrate or surface. The writing tip may be fixed (i.e. always extending out of the body) or retractable.

In the following, unless otherwise specified, "the visual mark" or "the mark" should be understood as "the at least one visual mark". The visual mark may have any shape, may comprise any colour, relief, etc. The visual mark is a specific mark for augmented reality applications. This means that the visual mark may be configured to be detected by an augmented reality smart device. When visible, the visual mark may be seen from the outside of the writing instrument, directly, i.e. with a naked eye or indirectly, i.e. with the help of any tool, such as a specific camera, etc. When hidden, the visual mark cannot be seen from the outside of the written instrument. For example, the visual mark may be visible when the writing tip is distant from a writing surface and hidden when the writing tip is in contact with a writing surface. In examples, the visual mark may be hidden when the writing tip is distant from a writing surface and visible when the writing tip is in contact with a writing surface. When visible, the entire visual mark may be visible, or only a part of the visual mark may be visible. When hidden, not part of the visual mark is visible. The visual mark may form a dynamic tracker. A dynamic tracker may be construed as a guiding system which may have different configurations/shapes/colors or the like in order to inform, for example an augmented reality application, that something happened/moved/etc., i.e. the occurrence of an event, predetermined or not.

Such a writing instrument may be passive, i.e. without any electric powered element/electronic element.

For example, when the visual mark (or primary visual mark) is hidden, another visual mark (or secondary visual mark), which is distinct from the visual mark, may be visible, while the other visual mark is hidden when the visual mark is visible. In examples, when the visual mark is hidden a blank area may be visible, while the blank area is hidden when the visual mark is visible, i.e. there is no other mark visible/hidden when the visual mark is respectively hidden/visible, but only a blank area instead.

Thanks to the detection or not of the visual mark, it may be easily and accurately determined whether the writing tip is in contact or not with a writing surface. In the frame of an augmented reality application or writing digitalization, this may allow an easy and accurate determination of when a stroke needs to be recorded or not. A stroke may be any writing, for example just a point, a line, or any geometric shapes, a single letter, a single word, etc. Once a track is visible, a software from a mobile application/an augmented reality smart device may start recording the movement of the writing instrument, recording the stroke.

In embodiments, the writing tip may be axially movable with regard to the body between a rest position and a contact position when the writing tip is pressed against a writing surface, the at least one visual mark being hidden/visible when the writing tip is in the rest position and visible/hidden, respectively, when the writing tip is in the contact position.

In the rest position the writing tip may be distant from a writing surface while the contact position the writing tip may be in contact with a writing surface. The writing tip may extend from the body more in the rest position than in the contact position.

In embodiments, the at least one visual mark may extend annularly (i.e. all) around the axis.

In embodiments, the at least one visual mark may extend in a surface forming an angle comprised between 45° and 90° with the axis (X), at a rear end of the writing instrument.

The rear end of the writing instrument is the end, opposite along the axial direction, to the writing tip. The surface may have any shapes, a form at least locally an angle comprised between 45° and 90°. For example the surface may be plane or curved.

In embodiments, the body may comprise at least one transparent window, the at least one visual mark being visible through the at least one window, when visible (i.e. when not hidden).

In the following, unless otherwise specified, "the window" should be understood as "the at least one window". The window may be made of any material, may have any colour, etc.

The number of windows may be the same as the number of visual marks. Each window may be associated with a single visual mark. When visible, the visual mark may be visible through the window. When hidden, the visual mark cannot be visible through the window. The rest of the body, or at least portion(s) adjacent to the window, is(are) configured to hide the visual mark when it is not aligned with the window. For example, the rest of the body, or at least portion(s) adjacent to the window, is opaque.

In embodiments, the at least one window may extend annularly (i.e. all) around the axis.

In embodiments, the at least one window may be formed by a portion of the body.

In embodiments, a writing element may comprise the writing tip, the at least one visual mark being formed on a portion of the writing element.

For example, the writing element may comprise the writing tip and a reservoir. The reservoir may be provided with ink or with one or several leads. If the writing element is part of a stylus, there is no necessarily a reservoir. In this case, the writing element may comprise a stylus tip and a barrel or a mounting portion supporting the stylus tip. The writing elements may be retractable by any mechanism known by the skilled person, or fixed (i.e. the writing tip always projecting from the body). The visual mark may be coupled with the writing element and move together with the writing element when the writing tip moves between the rest position and the contact position.

In embodiments, a shutter may be coupled to the writing tip, the shutter being configured to hidden/reveal the visual mark when the writing tip moves between the rest position and the contact position (and vice versa).

For example, when the writing tip touches any surface, the shutter is actuated and opens hence «revealing» the visual mark(s) and when the writing tip is not in contact with a surface, the shutter remains closed hence «hiding» the visual marks. The operation of the shutter may be mechanical (i.e. mechanically connected with the tip) or electronical, for example depending on the required sensitivity (electronic device may be much more sensitive to pressure changes than mechanical device).

In embodiments, the at least one visual mark may be hidden when the writing tip is in the rest position and may be visible when the writing tip is in the contact position.

In embodiments, the at least one visual mark may be not visible by naked eye.

For example, the mark may be formed with a material mainly visible via a camera and post-processing, such as ink mainly visible out of the naked eye visible spectrum. In other words, the mark is visible, but not by naked eye. In particular, the mark is visible (but not by naked eye) in the visible configuration, and hidden (and thus not visible at all) in the hidden configuration.

In embodiments, the writing instrument may comprise at least one second visual mark configured to be detected by an augmented reality smart device, the at least one second visual mark being always visible.

In the following, unless otherwise specified, "the second visual mark" or "the second mark" should be understood as "the at least one second visual mark". The second visual mark may have any shape, may comprise any colour, relief, etc. The second visual mark is a specific mark for augmented reality applications. The second visual mark may form a static tracker. A static tracker may be construed as a guiding system having always the same configuration/shape or the like.

In embodiments, the at least one second visual mark may extend annularly (i.e. all) around the axis.

In embodiments, the at least one visual mark may comprise a first visual pattern and the at least one second visual mark may comprise a second visual pattern which is different from the first visual pattern.

In embodiments, the at least one second visual mark is not visible by naked eye.

In embodiments, a set comprises a writing instrument according to any one of the embodiments of the present disclosure, and a holder for a smart device.

The holder may be formed by a cap or a protective box of the writing instrument.

In embodiments, a method for detecting whether a writing tip contacts a writing surface, comprises providing a writing instrument substantially as disclosed herein, and detecting whether the at least one visual mark is visible/hidden for determining whether the writing tip is in contact with a writing surface or not.

Such a method may be part of a method for tracking and positioning a writing instrument in a 2D or 3D space (i.e. two or three dimensions space).

In embodiments, a computer program includes instructions for executing the steps of the method substantially as disclosed herein when the program is executed by a computer.

The program may use any programming language and may take the form of source code, object code or a code intermediate between source code and object code, such as a partially compiled form, or any other desirable form.

In embodiments, a recording medium readable by a computer has recorded thereon a computer program including instructions for executing the steps of the method substantially as disclosed herein.

The recording medium may be any entity or device capable of storing the program. For example, the medium may include storage means such as a ROM, for example a CD ROM or a microelectronic circuit ROM, or magnetic storage means, for example a diskette (floppy disk) or a hard disk. In examples, the recording medium may be an integrated circuit in which the program is incorporated, the circuit being adapted to execute the method in question or to be used in its execution.

Such writing instruments, sets, and methods may form simpler and/or cost effective writing instrument adapted for augmented reality applications and/or writing digitalization. Such writing instruments, sets, and methods may help to easily and accurately determine whether the writing tip is in contact or not with a writing surface and may allow an easy and accurate determination of when a stroke needs to be recorded or not.

BRIEF DESCRIPTION OF THE DRAWINGS

The disclosure can be better understood by reading the detailed description of various embodiments given as non-limiting examples. The description refers to the accompanying sheets of figures, in which.

DETAILED DESCRIPTION

Figure 1:
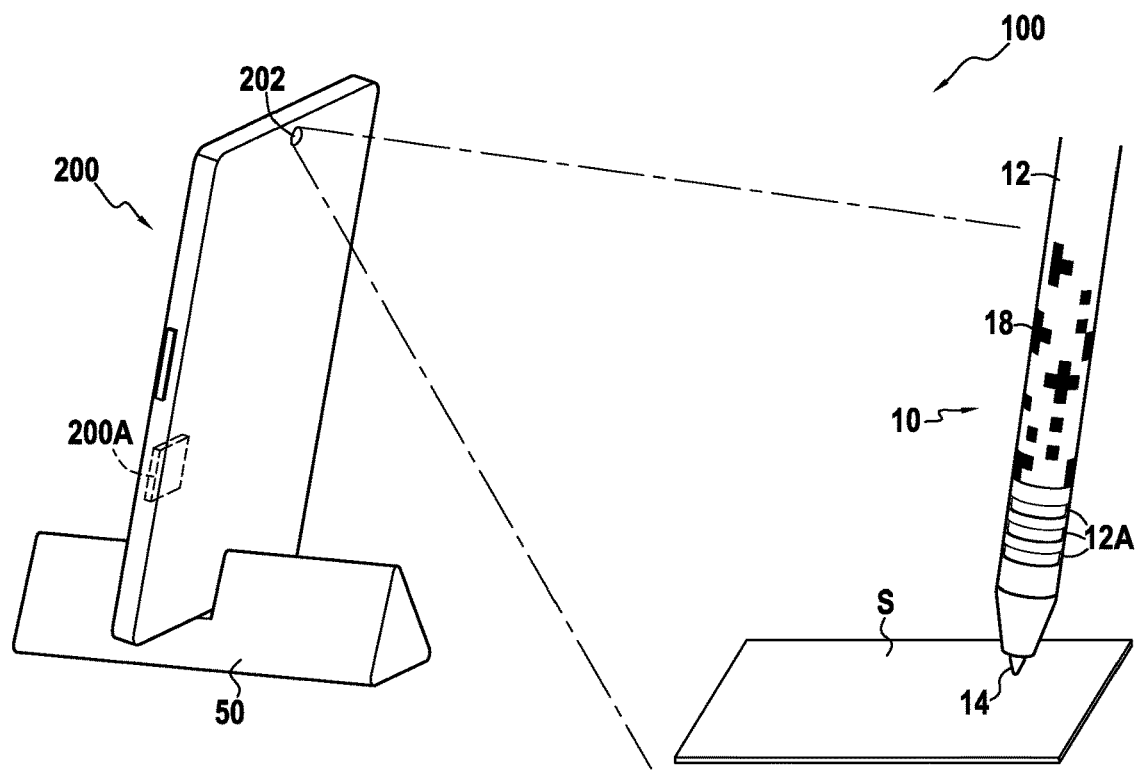
FIG. 1 shows a set comprising a writing instrument, the writing tip being distant from a writing surface
Figure 2:
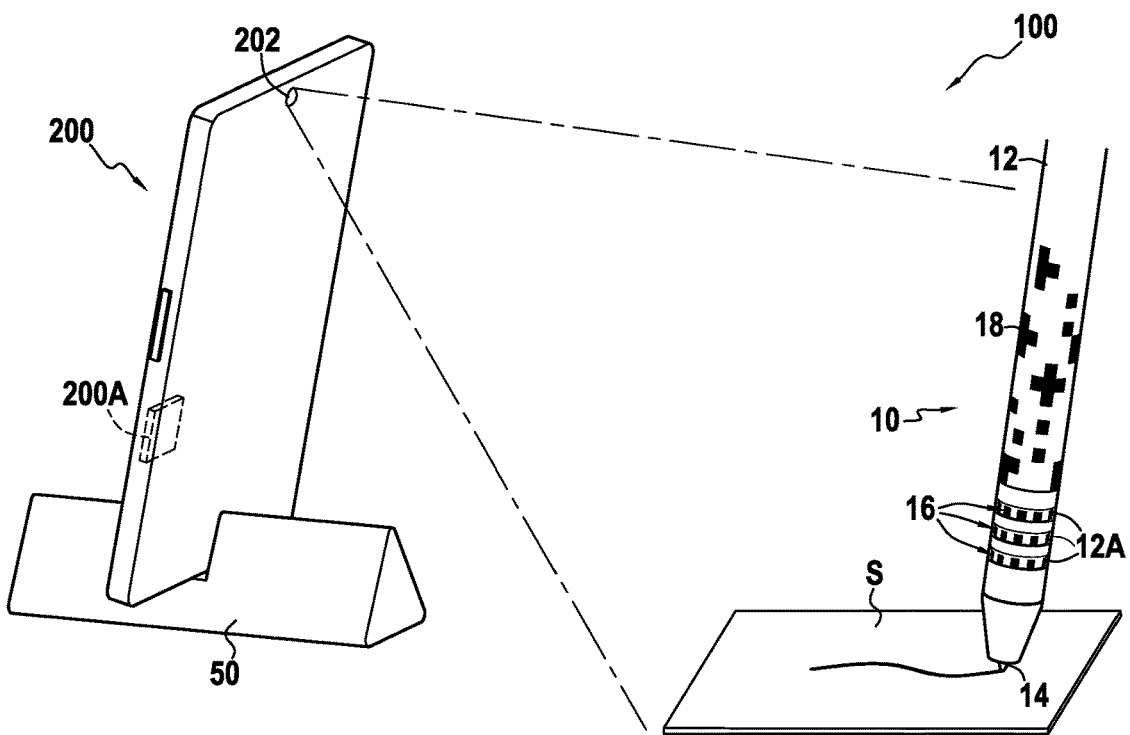
FIG. 2 shows the writing instrument of FIG. 1 when the writing tip is in contact with a writing surface.

FIGS. 1 and 2 show a set 100 comprising a writing instrument 10 and a holder 50 for a smart device 200. The smart device 200 may be removably placed on the holder 50 with its camera 202 oriented toward a 3D space comprising a writing surface S.

The writing instrument 10, in this example a ball point pen, comprises a body 12 having an axis X and a writing tip 14. The writing instrument 10 comprises at least one visual mark 16, in this example three visual marks 16, configured to be hidden when the writing tip 14 is distant from a writing surface S (see FIG. 1) and to be visible when the writing tip 14 is in contact with a writing surface S (see FIG. 2). The marks 16 are configured to be detected by an augmented reality smart device, such as the smart device 200. The writing instrument 10 may comprise less or more than three visual marks 16. In alternative embodiments, the visual marks 16 may be hidden when the writing tip 14 is in contact with the writing surface S and visible when the writing tip 14 is distant from the writing surface S. Each visual mark 16 may extend annularly all around the axis X.

Figure 3:
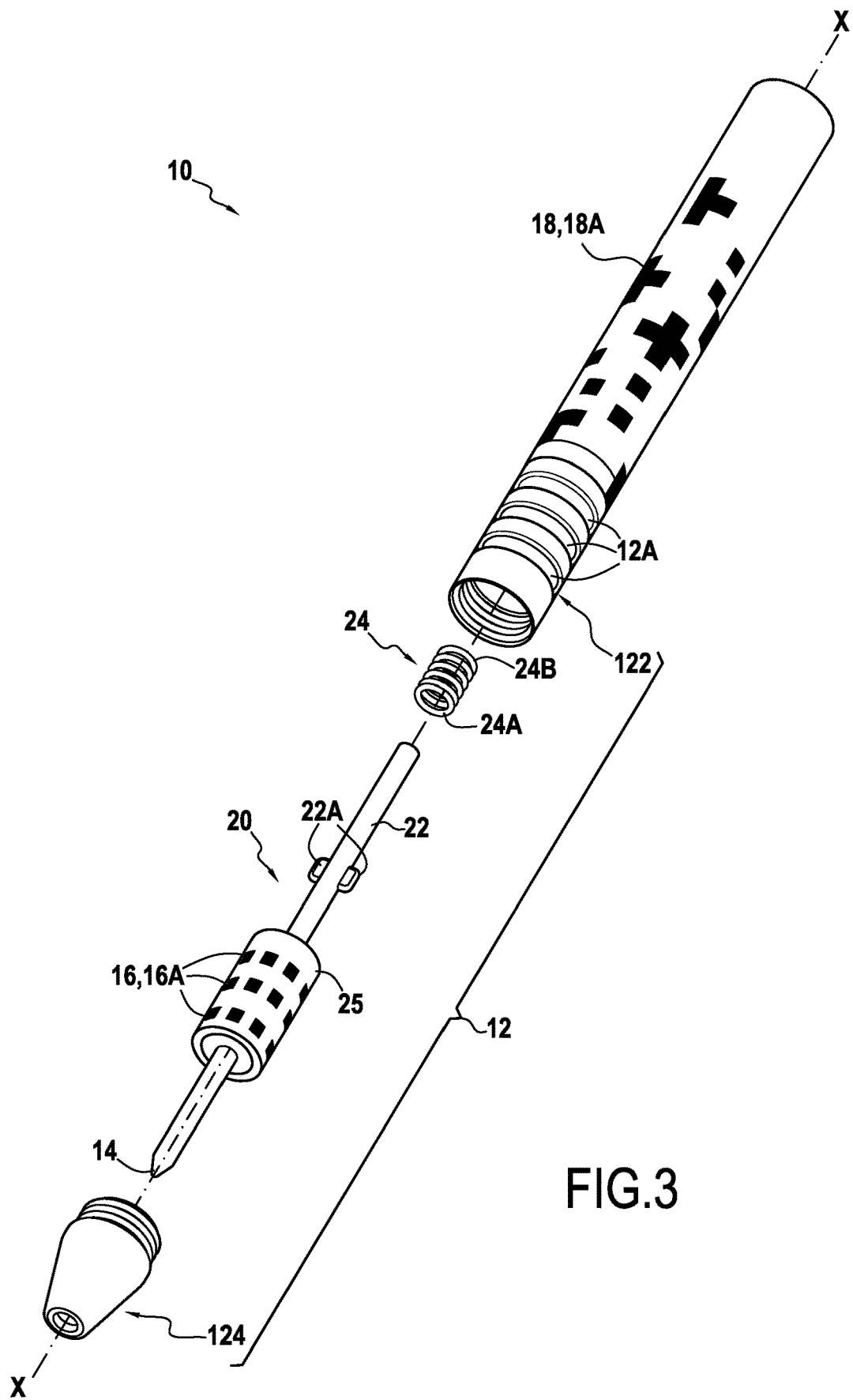
FIG. 3 shows an exploded view the writing instrument of FIG. 1.

In the example of FIGS. 1 to 3, the body 12 comprises three transparent windows 12A, one for each visual mark 16, the visual marks 16 being visible through the windows 12A, when visible (i.e. when not hidden). The windows 12A may each extend annularly all around the axis X. The windows 12A may respectively be formed by a portion of the body 12. In examples, other number of windows may be foreseen, depending on the number of visual marks. In examples, the number of windows does not correspond to the number of visual marks, e.g. two visual marks may be visible through the same window or a single visual mark may be visible through more than one window.

The writing instrument 10 may comprises a second visual mark 18 which is always visible. The second visual mark is configured to be detected by an augmented reality smart device, such as the smart device 200. The second visual mark 18 may extend annularly all around the axis X. The visual marks 16 may each comprise the same first visual pattern 16A while the second visual mark 18 may comprise a second visual pattern 18A which is distinct and different from the first visual pattern 16A. The writing instrument 10 may comprise more than a single second visual mark. Some or all of the visual patterns of the visual marks 16 may be different from each other. The visual marks 16 may form a dynamic tracker and the second visual mark 18 may form a static tracker.

with the provision of the second visual mark 18 forming a static tracker on an outer surface of the body 12 of the writing instrument 10 allows for the writing instrument 10 to be accurately tracked and positioned relative to the camera of the smart device 200, e.g. using augmented reality techniques that support the capture real-time interaction of the specific visual mark 18 when the writing instrument 10 moves on the writing surface S and to create, register and/or translate the 2D or 3D representations in space of such movement of the writing instrument 10 on the writing surface S. Smart devices, e.g. a mobile phone or a tablet having a camera and enabled to create augmented reality representations are well-known in the field and will thus not be discussed in detail.

With reference to FIG. 3, the writing instrument 10 may comprise a writing element 20 received in part within the body 12. The body 12 may comprise a rear barrel 122 and a front part 124 mounted onto the rear barrel 122. The front part 124 may be screwed, snap fitted, welded, etc. with the rear barrel 122. The front part 124 may comprise a nose cone, a front barrel, etc. The windows 12A may be formed in the wall of the rear barrel 122.

The writing element 20 may comprises the writing tip 14 and a reservoir 22 onto which the writing tip 14 is mounted. The writing element 20 may comprise an annular portion 25 having the visual marks 16. The annular portion 25 may be fitted, for example press fitted, around and coaxially with the reservoir 22. The annular portion 25 may be blank between the adjacent visual marks 16.

The writing tip 14 may be configured to axially move with regard to the body 12 between a rest position (see FIG. 1) and a contact position (see FIG. 2) when the writing tip is pressed against a writing surface. For example, the reservoir 22 may comprises two radially opposed projections 22A configured to bear against an end 24A of a compression spring 24. The opposite end 24B of the compression spring 24 may bear against an abutment not shown located inside the body 12, in this example inside the rear barrel 122. The writing element 20, and thus in this example the writing tip 14, may axially move due to the compression of the spring 24 when a pressure is applied onto the writing tip 14, for example when writing. For example, the axial strike of the writing tip 14 may be axially limited due to the stiffness of the spring 24, or due to an abutment between the coils of the spring 24, or due to an abutment of the writing element 20 against a stop not shown located inside the body 12. The axial strike of the writing tip 14 may be configured so that the writing tip 14 remains always at least in part out of the body 12 and able to be in contact with a writing surface for writing.

The writing instrument 10 may be configured so that the visual marks 16 are hidden within the body 12 when the writing tip 14 is in the rest position and visible through the windows 12A when the writing tip 14 is in the contact position. For example, the axial strike of the writing tip 14 may be equal or less than the axial space between the adjacent windows 12A. The axial space (or distance) between the adjacent visual marks 16 may corresponds to the axial extension of the windows 12A. The axial space between the adjacent windows 12A may be equal or more than the axial extension of the marks 16. The axial extension of each window 12A may be equal or different, the axial extension of each visual mark 16 may be equal or different, the axial space or distance between each adjacent window 12A may be equal or different and the axial space or distance between each adjacent visual mark 16 may be equal or different.

The writing instrument 10 may be totally passive.

The smart device 200 may comprise a recording medium 200A readable by a computer and may have recorded thereon a computer program including instructions for executing the steps of the method described hereafter. In other words, the smart device 200 may include an application, as a computer program including instructions for executing the steps of the method described hereafter when the program is executed by a computer (in this example the smart device 200).

An embodiment of a method for detecting whether a writing tip contacts a writing surface, using the set 100, is described with reference to FIGS. 1 and 2.

The method may comprise a preliminary step of placing the smart device 200 onto the holder 50. The camera 202 of the smart device may be oriented toward a 3D space comprising a writing surface S and wherein the writing instrument 10 may be used.

The position of the writing instrument 10 in the 3D space may be determined using the second visual mark 18.

The method may comprise detecting whether the visual marks 16 are visible/hidden for determining whether the writing tip 14 is in contact with the writing surface S or not.

In the present example, when the visual marks 16 are hidden, it is determined that the writing tip 14 is not in contact with the writing surface S, as in FIG. 1. When the visual marks 16 are visible, it is determined that the writing tip 14 is in contact with the writing surface S, as in FIG. 2.

In examples, when the visual marks 16 (either hidden or visible) indicate that the writing instrument 10 is in a writing state, the method may further comprise determining a position of the writing instrument 10 in the 3D space using the second visual marks 18. This may be done by tracking or tracking and recording the second visual mark 18 in 2D or 3D space using the camera 202 of the smart device 200. The method may further comprise processing the tracked images to determine what is being written by the user. The method may further comprise reproducing the processed tracked images, i.e. what is being written by the user on the screen of the smart device 200. In examples, provided an adequate connection is established, the step of reproducing the processed tracked images on the screen may involve a screen of a separate device. When the user stops writing, the visual marks 16 indicate that the writing device is now in non-writing (hovering) mode and thus the smart device 200 stops the tracking/recording of the second visual mark 18 and no further output is depicted and/or recorded on the screen.

The visual marks 16 and/or the second visual mark 18 may be not visible by naked eye. The method may comprise a specific step of post-processing the image captured by the camera 202 of such visual marks 16/18.

Such a method may be part of method for tracking and positioning a writing instrument in a 2D or 3D space. Such a method may be part of an augmented reality application and/or of a writing digitalization.

Although the present disclosure is described with reference to specific examples, it is clear that modifications and changes may be made to these examples without going beyond the general scope of the disclosure. In particular, individual characteristics of the various embodiments shown and/or mentioned may be combined in additional embodiments. Consequently, the description and the drawings should be considered in a sense that is illustrative rather than restrictive.

Additionally, all of the disclosed features of an apparatus may be transposed, alone or in combination, to a method and vice versa.

The invention claimed is:

1. A writing instrument comprising:
    a body having an axis and at least one transparent window formed in a portion of the body, wherein the body includes a rear barrel and a front part, wherein the at least one transparent window is formed in a wall of the rear barrel, wherein the at least one transparent window is made of a transparent material, wherein the at least one transparent window extends annularly around the axis, and wherein the front part is configured to circumferentially couple and decouple to the rear barrel;
    a writing element, the writing element including a writing tip, a reservoir containing ink or leads, a compression spring, and at least one visual mark configured for augmented reality applications, wherein the front part is closer to the writing tip than the rear barrel; and
    a shutter coupled to the writing tip,
    wherein the reservoir includes two radially opposed projections extending from the reservoir and biasing directly against a first end of the compression spring,
    wherein the at least one visual mark is at least one first visual mark, wherein the at least one first visual mark includes a hidden configuration and a visible configuration, such that, in the hidden configuration, the at least one first visual mark is hidden within the body when the writing tip is fully extended but distant from a writing surface and, in the visible configuration, the at least one transparent window of the body reveals the at least one first visual mark through the at least one transparent window when the writing tip is in contact with the writing surface, wherein pressing the writing tip against the writing surface transitions the shutter from a closed configuration to an open configuration, wherein, in the closed configuration, the at least one first visual mark is in the hidden configuration, and in the open configuration, the at least one first visual mark is in the visible configuration.

2. The writing instrument according to claim 1, wherein the writing tip is axially movable with regard to the body wherein pressing the writing tip against the writing surface transitions the at least one first visual mark from the hidden configuration to the visible configuration.

3. The writing instrument according to claim 1, wherein the at least one first visual mark extends annularly around the axis.

4. The writing instrument according to claim 1, wherein the at least one first visual mark is formed on an annular portion fitted around the writing element.

5. The writing instrument according to claim 4, wherein the annular portion is fitted coaxially with the reservoir.

6. The writing instrument of claim 1, wherein a second opposite end of the compression spring bears against an abutment located inside the body.

7. The writing instrument according to claim 1, wherein the at least one first visual mark comprises an ink not visible by a naked eye in the visible configuration.

8. The writing instrument according to claim 1, further comprising at least one second visual mark, wherein the at least one second visual mark is a specific mark for augmented reality applications, and wherein the at least one second visual mark is always visible.

9. The writing instrument according to claim 8, wherein the at least one first visual mark comprises a first visual pattern and the at least one second visual mark comprises a second visual pattern which is different from the first visual pattern.

10. The writing instrument according to claim 8, wherein the at least one second visual mark comprises an ink not visible by a naked eye.

11. A set comprising a writing instrument according to claim 1, a holder for a smart device and a smart device including a camera configured to detect the at least one first visual mark.

12. A method for tracking a writing instrument when contacting a writing surface, the method comprising steps of:
    providing a set, the set comprising:
        the writing instrument;
        a holder for a smart device; and
        the smart device, wherein the writing instrument includes:
            a body having an axis with a first window made of a transparent material and a second window made of the transparent material, wherein the first window and the second window extend annularly around the axis;
            a writing element with a writing tip, a first visual mark, and a second visual mark; and
            a shutter coupled to the writing tip, wherein the second window is separated from the first window along a length of the body such that the first window is closer to the writing tip than the second window;
    placing the smart device onto the holder;

orienting a camera of the smart device toward a 3D space comprising the writing surface; and detecting a presence of the first visual mark and the second visual mark, wherein the first visual mark and the second visual mark are visible to the camera, through the first window and the second window respectively, when the writing tip is in contact with the writing surface, wherein the first visual mark and the second visual mark are hidden from the camera, within the body of the writing instrument, when the writing tip is fully extended but distant from the writing surface, wherein the shutter is actuated and opened to reveal the first visual mark and the second visual mark to the camera when the writing tip is in contact with the writing surface, and wherein the shutter is actuated and closed to hide the first visual mark and the second visual mark from the camera when the writing tip is not in contact with the writing surface.

13. The method according to claim 12, further comprising, using the writing instrument on the writing surface, determining a position of the writing instrument in the 3D space using at least one third visual mark, wherein the at least one third visual mark is a specific mark for augmented reality applications, and wherein the at least one third visual mark is always visible.

14. The method according to claim 13, further comprising processing images captured by the camera of the first visual mark and the second visual mark to determine what is being written by a user using the writing instrument on the writing surface, and reproducing the processed images on a screen of the smart device.

15. A computer program including instructions for tracking a writing instrument when contacting a writing surface by a computer or smart device detachably coupled with a holder, the computer program comprising steps of:

detecting a presence of at least one visual mark of the writing instrument, wherein the writing instrument includes a body having an axis with at least one transparent window and a writing element, wherein at least one transparent window is made of a transparent material, wherein the at least one transparent window extends annularly around the axis, wherein the writing element includes a writing tip, a reservoir containing ink or leads, a shutter coupled to the writing tip, and the at least one visual mark, wherein the body includes a rear barrel and a front part, wherein the at least one transparent window is formed in a wall of the rear barrel, wherein the front part is configured to circumferentially couple and decouple to the rear barrel, and wherein the front part is closer to the writing tip than the rear barrel, wherein the computer or smart device detachably coupled with a holder includes a camera, wherein, when the computer or smart device is coupled with the holder, the camera is oriented towards a 3D space comprising the writing surface, wherein the at least one visual mark is visible to the camera, through the at least one transparent window, when the writing tip is in contact with the writing surface and the at least one visual mark is hidden from the camera, within the body of the writing instrument, when the writing tip is distant from the writing surface, and wherein the shutter is actuated and opened to reveal the at least one visual mark to the camera when the writing tip is in contact with the writing surface and the shutter is actuated and closed to hide from the camera the at least one visual mark when the writing tip is not in contact with the writing surface.

16. The computer program according to claim 15, further comprising a step of processing images captured by the camera of the at least one visual mark to determine what is being written by a user using the writing instrument on the writing surface, and reproducing the processed images on a screen of the smart device.

17. The writing instrument of claim 1, wherein the body has a second transparent window formed in the wall of the rear barrel extending annularly all around the axis, wherein the second transparent window is separated from the at least one transparent window along the axis such that the at least one transparent window is closer to the writing tip than the second transparent window.

18. The writing instrument of claim 1, wherein the at least one first visual mark is a dynamic tracker such that, when the at least one first visual mark is in the visible configuration, the at least one first visual mark shifts between a first shape and a second shape.

19. The writing instrument of claim 1, wherein the writing instrument does not comprise electric powered elements.

20. The writing instrument of claim 1, further comprising an annular portion fitted around the writing element, wherein the at least one first visual mark, a second visual mark, and a third visual mark are formed on the annular portion such that the at least one visual mark is a first distance from the writing tip, the second visual mark is a second distance from the writing tip, and the third visual mark is a third distance from the writing tip, wherein the first distance is less than the second distance, and the second distance is less than the third distance, and further wherein the at least one first visual mark, the second visual mark, and the third visual mark comprise a first visual pattern.

* * * * *

UNITED STATES PATENT AND TRADEMARK OFFICE
CERTIFICATE OF CORRECTION

| | | |
|---|---|---|
| PATENT NO. | : 12,429,961 B2 | Page 1 of 1 |
| APPLICATION NO. | : 18/004524 | |
| DATED | : September 30, 2025 | |
| INVENTOR(S) | : Loic Folgoas and Georgios Georgakis | |

It is certified that error appears in the above-identified patent and that said Letters Patent is hereby corrected as shown below:

On the Title Page

Item (71), Applicants, after "SOCIÉTÉ BIC," delete "Clichy (FR)" and insert --Clichy Cedex (FR)--.

Item (72), Inventors, after "Loic Folgoas," delete "Clichy (FR)" and insert --Clichy Cedex (FR)--.

Item (73), Assignees, after "SOCIÉTÉ BIC," delete "Clichy (FR)" and insert --Clichy Cedex (FR)--.

In the Claims

Column 9, Line 15, in Claim 12, after "surface," delete "and".

Column 9, Line 39, in Claim 15, after "wherein" insert --the--.

Signed and Sealed this
Eighteenth Day of November, 2025

John A. Squires
*Director of the United States Patent and Trademark Office*